Feb. 19, 1957  D. G. STALHANDSKE ET AL  2,781,585
GAUGE FOR MEASURING INTERNAL DIMENSIONS
Original Filed Feb. 17, 1949  3 Sheets-Sheet 1
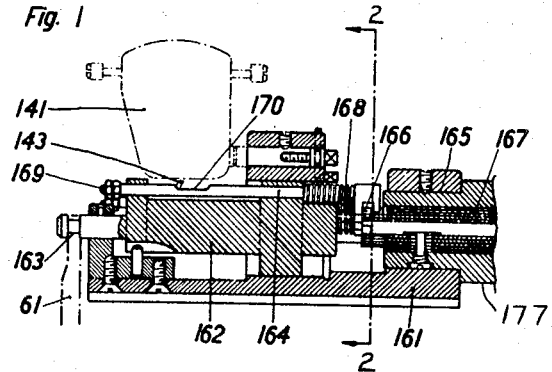
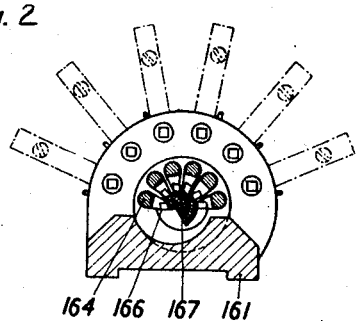
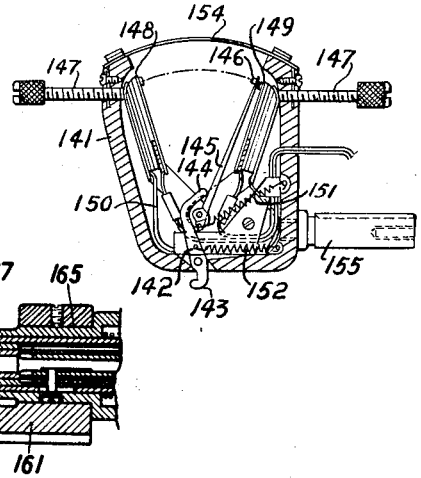
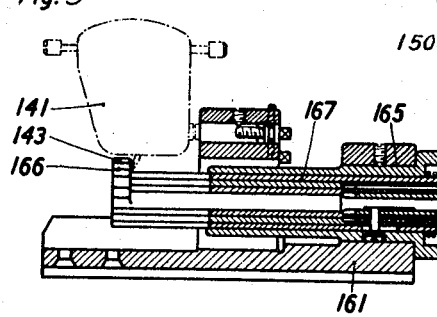

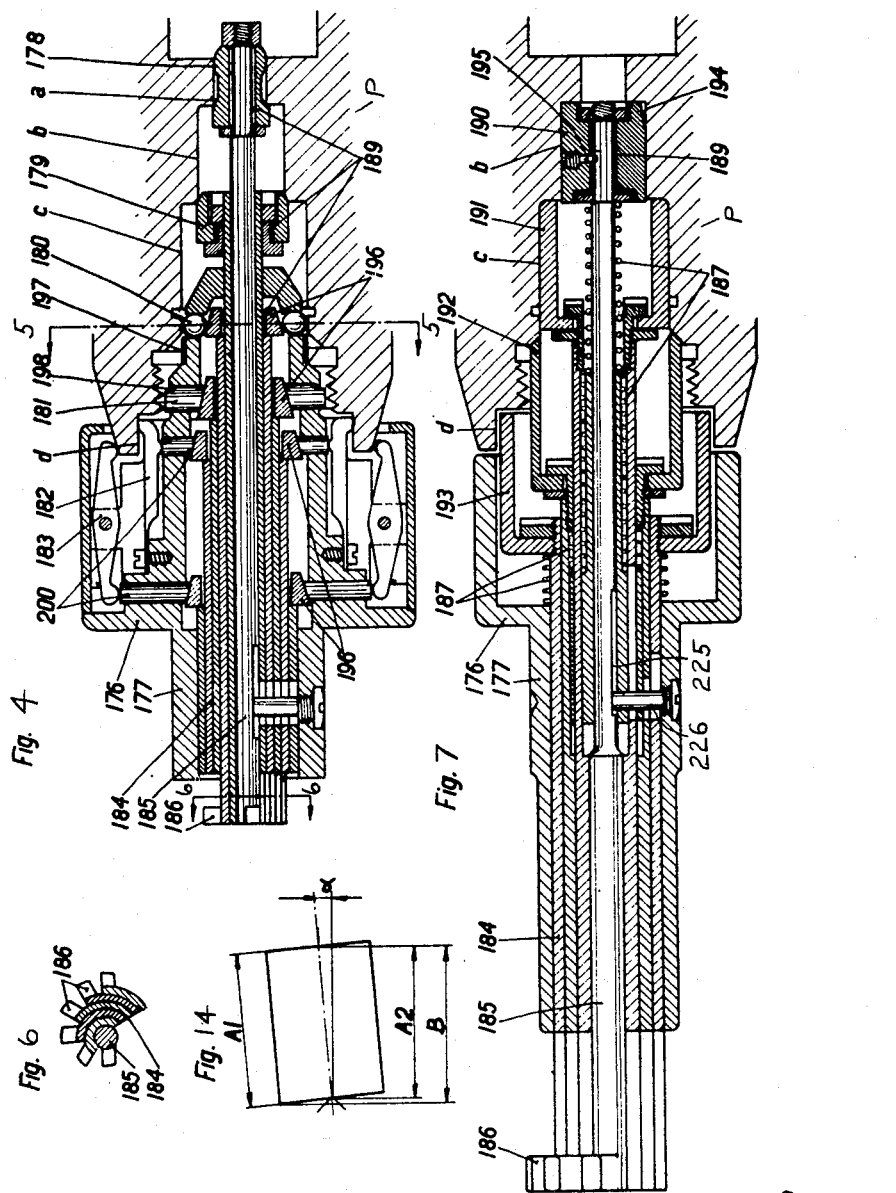

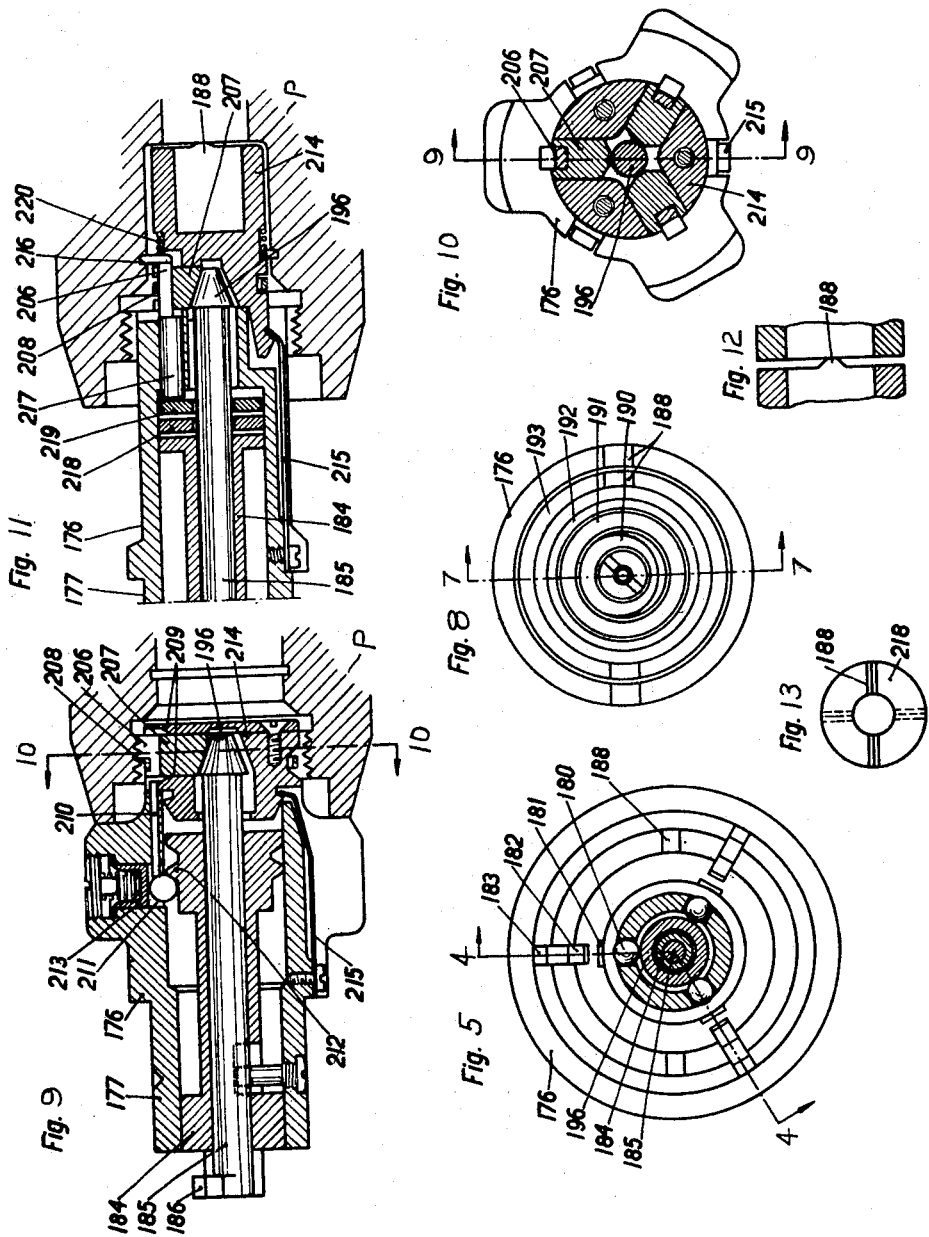

United States Patent Office 2,781,585
Patented Feb. 19, 1957

2,781,585

GAUGE FOR MEASURING INTERNAL DIMENSIONS

David Gabriel Stalhandske and Erik Arne Johnson, Bofors, Sweden

Original application February 17, 1949, Serial No. 76,894. Divided and this application October 1, 1951, Serial No. 249,054

10 Claims. (Cl. 33—174)

The present invention relates to gauges for measuring the dimensions of finished work pieces and is a division of our co-pending application Serial No. 76,894, filed February 17, 1949, now Patent No. 2,692,045, issued Oct. 19, 1954, relating to a machine for automatically gauging and sorting work pieces.

With machines of the above type it is often necessary to gauge one or more internal dimensions in a work piece such as the depth or diameter of a bore, female threading, groove depth and width, etc. The novel internal or plug gauge structure to be hereinafter described is adapted to measure a plurality of such dimensions simultaneously and the several dimensions gauged are converted respectively into corresponding displacements of the movable element of an electrical contactor device, the latter serving to condition an electrical circuit which controls a sorting device at the sorting station when any work piece whose dimensions exceed the selected tolerance arrives there. The sorting station is more particularly described in our aforesaid co-pending application.

With reference now to the accompanying drawings which present a preferred embodiment of the invention:

Fig. 1 is a view in vertical longitudinal section showing the gauge mounting and the electrical contactor device in position for gauging;

Fig. 2 is a view in vertical transverse section on line 2—2 of Fig. 1;

Fig. 3 is a view similar to Fig. 1 illustrating a modified construction for mounting the gauging elements in relation to the contactor device;

Fig. 4 is a view in vertical longitudinal section on line 4—4 of Fig. 5 of one form of the multiple element internal or plug gauge;

Figs. 5 and 6 are vertical transverse sections on lines 5—5 and 6—6 of Fig. 4, respectively;

Fig. 7 is a view similar to Fig. 4 on line 7—7 of Fig. 8 showing a modified construction for the gauging elements;

Fig. 8 is an end view of the gauge in Fig. 7;

Fig. 9 is a view in vertical longitudinal section on line 9—9 of Fig. 10 showing a further modification of the plug gauge particularly adapted for gauging female threading;

Fig. 10 is a view in vertical transverse section on line 10—10 of Fig. 9;

Fig. 11 is a view in vertical longitudinal section of still another embodiment of the novel plug gauge and which is particularly adapted for gauging internal grooves;

Figs. 12 and 13 are details of the gauge in Fig. 11;

Fig. 14 is a diagrammatic view used in explanation of certain features of the invention; and Fig. 15 is a view of the electrical contactor device used with each gauging element with the cover removed to show its structural detail.

With reference now to the drawings and in particular to Fig. 1, the gauge is seen to be comprised of a support base 161 that is adapted to be reciprocated horizontally to and from the work piece to be gauged when the work piece arrives at the measuring station as more particularly described in our aforesaid co-pending application. Carried upon support 161 is a primary piston 162. One end 163 of the piston is connected with an arm 61 which transmits a so-called secondary movement to piston 162 after the gauge support 161 has been given its primary movement in the direction of the work piece.

Within piston 162 are smaller secondary pistons 164 (six in number) distributed over an arc of substantially 180°, the pistons 164 being journalled in horizontal bores in the larger piston 162 for displacement in a direction along their respective axes. At the right end of the support base 161 an upstanding portion is provided which contains an aperture 165 for receiving a gauging element casing containing a plurality of concentrically arranged, independently slidable pressure sleeves 167 by which movement is imparted to the several gauge elements to be later described.

The center of aperture 165 is offset from that of piston 162 so that the pistons 164 can be positioned helically relative to the center of aperture 165 thus enabling the circumferentially spaced shoulders 166 on the sleeves 167, by turning of the gauge, to be brought into engagement with the front ends of their associated pistons 164, the said front ends being made with corresponding recesses the contact surfaces of which lie at right angles to the longitudinal axes of the pistons. Thus the plug gauge may be easily removed and mounted respectively when necessary for replacement.

The pistons 164 are kept pressed forwardly (to the right as viewed in Fig. 1) relative to piston 162 by springs 168, the power of which is selected for the measuring pressure desired for transmission via the sleeves 167 to the gauging elements as piston 162 is pushed forwardly when the measurements are made, but each piston 164 stops in the position corresponding to the particular dimension of the work piece for the respective place of measuring when the gauging element associated with that particular piston is stopped by the surface of the work piece. Check nuts 169 which strike against piston 162 are provided on the left ends of pistons 164 to limit return movement of pistons 164 by springs 168 when the piston 162 returns to its starting position.

Each piston 164 is provided with a notch 170 that establishes a shoulder for engagement with the actuating lever 143 of an electrical contactor device 141 which is fixed to the support base 161.

The contactor device as best shown in Fig. 15 is adapted to close an electrical circuit when the dimension in question exceeds the maximum or is less than the minimum limit of tolerance chosen. It is comprised of the casing 141 housing a pair of stationary, spaced contact members 148, 149 each held against an adjustment screw 147, that threads through the wall of casing 141, by means of a cantilever spring 150, and a pivotally mounted contact arm 145 having a contact 146 at its outer end adapted to move in an arcuate path between the stationary contacts 148, 149. A spring 151 loads arm 145 in the direction of contact 148. For actuating arm 145, a pivoted lever 142 is utilized. The upper end 144 of lever 142 bears against arm 145 and the lower end 143 protrudes from casing 141. Lever 142 also is loaded by a spring 152 so that the upper end 144 will always bear against arm 145 in such manner as to load the latter in the direction of stationary contact 149. The relationship between the two loading spring forces derived from spring 151 (acting directly upon arm 145) and spring 152 (acting directly upon lever 142) is so chosen that the latter will predominate with the result that in the rest position as shown in Fig. 15 contact 146 on arm 145 will be pressed against stationary contact 149. As lever 142 is caused to turn counter-clockwise however by movement of piston 164, spring 151 is then free to exert its force upon arm 145 causing the latter to follow and maintain contact with the upper end 144 of lever 142.

Before a work piece with axial bores to be gauged arrives at the measuring station, the base support 161 carrying the gauge structure occupies a position far enough to the left as viewed in Fig. 1 to provide clearance between the end face of the work piece and the outer or right end of the gauge structure. When the work piece has arrived and comes to a stop at the measuring station, the base support 161 then slides to the right to a predetermined initial or zero position from which the measurements are taken. In this position the gauging elements will be inside of the bore in the work piece. Piston 162 is then slid to the right by arm 61 causing a like movement of pistons 164 which through the springs 168 exert end pressure upon and displace the sleeves 167 to the right. Each sleeve 167 and the gauging element associated therewith will then travel until the gauging element comes to a stop against the particular surface in the base of the work piece assigned for measurement. After measurement has been taken arm 61 draws piston 162 to the left to the initial position and the pistons 164 follow the movement of piston 162 due to the engagement between the end of piston 162 and the check nuts 169 on pistons 164. The base support 161 also shifts to the left removing the sleeves 167 and gauging elements from the bore of the work piece so that the latter can pass on to the next measuring station for gauging other dimensions of the bore.

In the case of a plug gauge of the construction shown in Fig. 7, to be later described in more detail, and which is equipped with gauging elements corresponding to minimum dimensions of the bore in the work piece which the respective element shall be able to enter when having the accepted dimension but cannot enter if the bore is smaller than this minimum dimension, the gauging element and the pressure transmitter sleeve acting upon the same must be allowed a recoiling movement relatively to the measuring device, corresponding to the length of the bore, in order that the whole measuring device shall not be forced to stop when it is about to advance to measuring position. If the recoiling movement needed is larger than that permitted by the mounting shown in Fig. 1, the piston 162 with its associated components, pistons 164, springs 168, etc. is removed and the base 161 only is used as a mounting in the manner shown in Fig. 3. There it will be observed that the shoulders 166 of the pressure transmitting sleeves 167 bear directly upon the arms 143 of the electrical contactor devices when in measuring position but are separated from the arm in case of recoil movement to the left. The necessary measuring pressure on each pressure transmitting sleeve of Fig. 7 mounted as in Fig. 3 is suitably obtained by means of springs 187 inserted in the body of the plug gauge, as shown in Fig. 7 which load the sleeves towards the right.

The gauging element of the plug gauge which during the measurement is pushed into the bore of the work piece containing the surfaces to be gauged must be suited to the particular character of that surface. Different measuring methods for different measures may be combined in one plug gauge; at the same time as certain measurements of a certain surface (for instance, cylinder or thread) may be effected in one plug gauge and the other in one of several other plug gauges mounted at different measuring stations to which the work piece is brought.

Figs. 4, 7, 9 and 11 show by way of example different arrangements of gauges wherein different methods of measurement are provided to meet different requirements.

In Fig. 4, the gauge is characterized by a cylindrical casing 176 having a tubular portion 177 thereof of reduced diameter to be received in the aperture 165 of the slidable base 161. Mounted within the tubular portion 177 are a plurality of measuring elements 178—183 actuatable respectively by axially slidable concentrically arranged pressure sleeves 184 and rod 185 the ends of which protrude beyond the end of the tubular portion 177, and are provided with helicoidally positioned shoulders 186, as best viewed in Fig. 6, for engagement with actuating elements therefor such as the pistons 164 in Fig. 1. It will be recognized that the sleeves 167 and projections 166 of Fig. 1 are the same functionally speaking as sleeves 184 and projections 186 of Fig. 4.

A further feature of the gauges is the arrangement of the different measuring elements 178—183 in such manner as to obtain a certain degree of "floating" without affecting the measurement, i. e. that the measurement is not made dependent upon an exact centering between the gauge and work piece, and that when measuring depths and diameters of bores with so-called fixed measuring bodies, these are adapted to engage stop shoulders 188, see Figs. 8 and 12, lying in the same horizontal plane, which establish a horizontal substantially line contact that permits a certain inclination of the work piece with respect to this plane without affecting the degree of accuracy of the measurements. This feature is of importance where the work piece is placed in V-shaped blocks for measurement and outside diameters thereof at the V blocks deviate differently from the normal diameter but are still within the selected range of tolerance of manufacture which of course gives rise to the inclination under consideration. Thus with reference to Fig. 14 it is apparent that for a small angle α of work piece inclination from horizontal, the distance A1 becomes practically equal to distance A2, which is the case when stop shoulders 188 are used, whereas distance B will be greater than distance A1 if the stop shoulders 188 are omitted.

With reference now to Fig. 4 in particular, the plug gauge there illustrated is capable of performing six different measurements within the body of the work piece P. The diameter of the internal bore $a$ is gauged with the centermost measuring element 178 at the end of rod 185. The outer shell of element 178 can consist of either two cylindrical parts, each one at the front provided with a bevel (and a clearance groove intermediate the cylindrical parts where deeper bores are to be measured) or of two spherical parts, or a combination of cylindrical and spherical parts as illustrated, the front part in both cases corresponding to the maximum diameter of the bore so that when the measuring element is pushed axially into the bore $a$, the front part will go in but not the rear one if the bore diameter is within the selected limit of tolerance. If the bore is smaller than the minimum limit of the tolerance range, the fore part will not go in, and if it exceeds the maximum limit, the rear part also will pass into the bore. The axial aperture through the measuring element 178 is of somewhat larger diameter than that of the end portion of rod 185 on which it is mounted to provide a certain amount of radial clearance or "play" 189 therebetween whereby the necessary "floating," as previously discussed, is obtained.

In the work piece P, the bore $b$ adjacent bore $a$ is of larger diameter than bore $a$ with a sharp line of demarcation therebetween. Consequently since bore $b$ is not a through bore a gauging element of the maximum-minimum type such as gauge 178 cannot be used, and the maximum and minimum limits must be measured separately at different measuring stations and with different gauges. The maximum diameter of the bore $b$ can be gauged with the measuring element 179 of the plug gauge of Fig. 4. The outer shell of gauge element 179 can consist of a spherical surface or as illustrated a cylindrical surface provided with an entering bevel at the front end. The outer diameter of element 179 corresponds to the maximum diameter of bore *b* for which reason element 179 will be stopped if the diameter of bore *b* is within the range of tolerance, in which case the said gauge element will reach the outer edge of bore *b* upon movement of the measuring element 179 but passes into bore *b* if the diameter exceeds the tolerance limit. Element 179 is actuated by one of the sleeves 184 and radial clearance 189 is provided for in its mounting to permit a "floating" action.

With respect to the next adjacent bore *c* in the work piece P which is of still larger diameter, the gauge element for measuring its maximum diameter is comprised of a cylindrical portion of the gauge body 176 provided with three equally spaced radially extending bores containing gauging balls 180. A sleeve 197 of springy material partially covers the outer ends of the bores to prevent the balls from dropping out, and the balls are moved radially to gauge the bore *c* by means of a cone 196 movable axially by one of the sleeves 184, it being noted that radial "play" is also provided for "floating" of the conical body 196 as in the cases of the two other measuring elements 178 and 179.

The gauge structure of Fig. 4 also includes a gauging element for measuring the inner diameter of a female threaded portion of work piece P, i. e. the diameter at the tops of the threads. For this purpose, radially movable pistons 181 are utilized, the outer ends of the pistons engageable with the tops of the threads being cylindrical in shape while the inner ends engageable with the axially displaceable conical body 196 are inclined to match the taper on cone 196. Pistons 181, at least three in number and equally spaced about the axis of the gauge are slidable in bores disposed in the tubular gauge casing 176 and are prevented from falling out by a ring 198 of springy material guided radially in a groove around the outer surface of casing 176, the ring 198 resting against a recess located in the outer ends of pistons 181 and pressing the pistons inwardly when the associated pressure sleeve 184 shifts to the left after the gauging operation.

Also included in the Fig. 4 gauge structure are means for measuring the diameter of a bore *d* at the end of work piece P and the diameter of a conical portion of the exterior surface at the end of the work piece. For measuring the diameter of bore *d*, a plurality of fingers 182 serve as the gauging elements. The outer free ends of these fingers are adapted to be moved radially outward by pistons 200 slidably mounted in radial bores in the gauge body 176 by another cone 196 as the latter is slid to the right by its associated pressure transmitting sleeve 184 and the opposite ends of fingers 182 are attached to the gauge body 176. The fingers 182 have an inherent resilient characteristic which causes their outer ends and also pistons 200 to move radially inward as cone 196 is moved to the left after measurement has been taken.

For measuring the diameter of the cone surface, a plurality of levers 183 pivotally mounted intermediate their ends upon the gauge body 176 are utilized. The lever ends adjacent the surface to be measured are adapted to move radially inward to engage the cone surface as their opposite ends are pushed radially outward by pistons 200 also slidable in radial bores in gauge body 176 by another of the cones 196 and its associated sleeve 184.

For measuring the minimum limit of a bore having a sharp demarcation in diameter such as bore *b* in the work piece, a cylindrical measuring element 190 as illustrated in the plug gauge construction of Fig. 7 must be utilized. The diameter of the measuring element 190 corresponds to the minimum diameter of bore *b* and at the front or leading end the element is provided with an entering bevel 194 which is largest on the lower side and decreases upwards so that the upper side will correspond to the exact curvature of the bore *b*. The measuring element 190 is attached to the end of rod 185 in such manner as to provide radial "play" 189 therebetween thereby giving the element a "floating" action. A set screw 195 is used to lock the element 190 upon rod 185 to prevent relative rotation therebetween. Rod 185 is also provided with a longitudinally extending flat 225 in contact with the end face of a pin 226 anchored in the wall of the cylindrical portion 177 of the gauge body which permits rod 185 to move along its axis but prevents its rotation about its axis. Because the element 190 on account of the radial play space 189 prior to being pushed into the interior of the work piece and bore *b* in particular may be located somewhat lower than bore *b*, it is evident that the entering bevel 194 will be useful under such conditions to guide the element into the bore.

The gauge construction of Fig. 7 also includes a somewhat different gauge element for measuring a bore *c* such as includes a bevelled outer edge and rounded inner end. Here the gauging element is in the form of a cylindrical cup 191. The base of the cup 191 is apertured for mounting upon the end of its associated actuating sleeve 184 in such manner as to establish a certain amount of radial "play" space 189, and the edge of the cup is shaped to conform with the rounded inner end of bore *c*. With this construction it is thus not necessary to provide the gauging element with any special entering bevel such as bevel 194 of gauge element 190 since the rounded cup edge in combination with the "floating" action of the cup are all that are necessary to assure entrance of the gauge element in the bore.

In the measuring methods which have been described, the tolerance limits of the several different bore minimum diameters of work piece P are determined through the outer diameter of the respective measuring element, for which reason the tolerances registered on the maximum-minimum indicators 141 will be the tolerances on the depth dimension of the bore and not the diameter tolerances, and therefore the diameters as well as the depth of the bores are gauged simultaneously. In the event the bore is not too deep and the diameter is less than the minimum limit of tolerance, the minimum gauge element will not pass into the bore, and as a consequence the work piece will be sorted out at the sorting station as a correctable one. However if the bore is too deep, the work piece should be sorted out as uncorrectable.

If it is desirable to prevent such events, measurement of the bore depth may be effected separately with a gauging element having a diameter as much below the minimum tolerance limit as may reasonably be anticipated. Thus in Fig. 7 the cup-shaped gauging element 193 for measuring the depth of bore section *d* separately is connected at its base with its associated sleeve 184, the connection being rigid, that is without radial "play." The diameter of the cup 193 is obviously much less than the minimum tolerance limit for bore *d* and to assure entry in the event the work piece is slightly inclined from horizontal, the front side of the cup 193 is provided with shoulders 188 disposed in a horizontal plane as shown in Fig. 8.

Measurement of conical surfaces on the work piece may be carried out according to the Fig. 7 construction by a gauge element in the form of a cup 192 secured at its base to the associated sleeve 184 in such manner as to permit radial "play" therebetween. The edge of the cup is tapered to match the taper on the conical portion of the work piece, the measurement taking place at a fixed distance from the basic plane of the cone or from another plane at a right angle to the longitudinal axis of the cone, depending upon the dimensions of the work piece.

The gauge construction shown in Fig. 9 is adapted particularly for gauging the mean diameter and profile of female threads in the work piece. The gauge body 176, 177 is adapted for support upon base 161 in the manner shown in Fig. 1 or Fig. 3 and includes at least three equally spaced threading dies or anvils 206 which in axial direction are displaceably journalled in radially movable pistons 207 actuated by a "floating" cone 196 and a pressure rod 185. The thread gauging anvils 206 and pistons 207 are pressed radially inward by one or more split resilient rings 208 the power of which is of course less than the spring power which via the rod 185 and cone 196 presses anvils 206 outwards when measurement is taken. Since anvils 206 are axially displaceable, the threaded edges thereof can "float" axially into the thread to be gauged independently of the axial initial position of the thread profile for instance through oblique recesses 209 located in front of and behind i. e. on both sides of the anvils, the recesses 209 being arranged so as to permit some play between anvil and thread no matter what their initial positions may be.

If the thread to be gauged has a plane top rather than a sharp edge, in which case it is possible that automatic alignment between thread and anvil will not under some conditions take place, the gauge is preferably provided with a special mechanism which exerts an initial axial push on the anvils 206. This mechanism consists for instance of a striking pin 210 acting axially upon each anvil which pin by means of a ball 211 is actuated by a cam 212 on pressure sleeve 184, the latter being actuated axially along with rod 185. When actuating pin 210 to the right, ball 211 rides against the face of cam 212 opposite from that shown in Fig. 9. Ball 211 is pressed against cam 212 by a spring actuated piston 213 so that in cases when anvils 206 slide into the thread without coincidence with the tops of the thread, piston 213 springs back when cam 212 pases ball 211. Piston 213 likewise springs back for the cam 212 when pressure sleeve 184, after the measuring operation, is withdrawn to its initial position. Should the anvils 206 and pistons 207 fail to return to their radially inward position damage to the gauge may be the result when it is withdrawn from the work piece. To avoid this risk, pistons 207 are journalled in a body 214 which by means of springs 215 is kept pressed against and guided by the gauge body 176. Springs 215 and body 214 are adapted to cooperate in such a manner that should body 214 as well as pistons 207 and anvils 206 jam in the work piece they will separate without damage from the rest of the gauge structure when the latter is withdrawn from the work piece. The separated pieces can then be reunited by pressing the same together.

The plug gauge construction of Fig. 11 is particularly adapted for measuring the diameter, distance and minimum width of grooves. Three anvils 206 having shoulders 216 corresponding to the minimum width of the groove and protruding into the groove, are displaceably journalled in axial direction in radially movable pistons 207 which are actuated by a "floating" cone 196 and pressure transmitter rod 185. Pistons 207 are pressed radially inward by a split resilient ring 208 and the cone 196 pushes the pistons 207 and anvils radially outward against the counter radial force of ring 208. The anvils 206 are from one end actuatable axially by a pressure transmitter sleeve 184 with the aid of pistons 217 and two plates 218, 219 disposed between pistons 217 and the flanged end of sleeve 184. Plate 218 adjacent the flange of sleeve 184 is provided with diametral ribs 188 on its opposite faces, the rib on one face being perpendicular to that on the opposite face as shown in Fig. 13 whereby to eliminate any influence on the measurement of groove depth as may be caused by possible inclination of the work piece and exactness of manufacture of the length dimensions of pistons 207 and anvils 206. From the opposite direction anvils 206 are actuated axially by a spring 220 less powerful than the force actuating sleeve 184 in the opposite direction. Consequently at the time of taking a measurement anvils 206 will be displaced axially until they arrive right in front of the groove at which moment they are pressed out by cone 196, and after the measuring is finished, the anvils 206 return to their initial positions. The depth dimension measured in the present example begins at the bottom of the bore, and therefore the stop shoulders 188 of the gauge are disposed at the end surface of the gauge.

If the anvils 206 and pistons 207 should fail to return to their initial positions after measurement has been taken the plug gauge would jam and for that reason is made divisible like the gauge shown in Fig. 9 and therefore includes the same corresponding elements, namely body 214 and three springs 215.

In conclusion we desire it to be understood that while the construction of each embodiment of our invention as described above is preferred, various minor changes in the construction and arrangement of component parts may be made without however departing from the spirit and scope of the invention as defined in the appended claims.

We claim:

1. A gauge device for measuring simultaneously a plurality of internal dimensions of a work piece comprising a plurality of pressure members stepped in length arranged coaxially each within the other for sliding longitudinal displacement between fixed limiting positions, gauge elements individual to and actuated by one end of each said pressure member for gauging different dimensions of said work piece, the displacement of each said pressure member being a measure of the corresponding dimension to be measured, each said pressure member being provided at its opposite end with a shoulder and said shoulders being arranged in circumferentially spaced relation, spring means for maintaining each of said pressure members at one of its limiting positions and gauge indicating means individual to each said pressure member, each said gauge indicating means being arranged in circumferential alignment with said shoulder on the respectively associated pressure member and being actuated by means including said shoulder.

2. A gauge as defined in claim 1 and wherein said pressure members are tubular of circular cross-section and each is slidable along the surface of the other.

3. A gauge of the type defined in claim 1 for measuring a bore in the work piece and wherein one of said gauging elements is comprised of two axial sections each provided with an entering bevel at the leading end, the front section corresponding to the minimum of the range in diametral tolerance selected for said bore and the rear section corresponding to the maximum of said range in tolerance.

4. A gauge of the type defined in claim 3 wherein said pressure member associated with said gauging element having said two axial sections is constituted by a shaft on which said element is mounted, there being a slight radial clearance between said shaft and gauging element to permit a corresponding floating action of said gauging element.

5. A gauge device as defined in claim 1 wherein one of said gauging elements is comprised of a plurality of radially displaceable elements actuated by an axially displaceable cone, said cone being mounted on a first one of said pressure members and with a slight radial clearance therebetween to permit a corresponding floating action of said cone and said cone being engageable by a second one of said pressure members surrounding said first pressure member to effect the said axial displacement thereof.

6. A gauge of the type defined in claim 1 for measuring internal threads wherein said radially displaceable elements are constituted by pistons having cylindrical shaped parts facing the thread, the ends of said pistons contacting the said cone having the same angle of inclination as that of said cone, and which further includes means preventing said pistons from rotating on their axis and means biasing said pistons radially inward.

7. A gauge of the type defined in claim 1 and which further includes a plurality of radially spaced lever arms pivotally mounted intermediate their ends for movement in radial planes, said lever arms being engaged respectively by said radially displaceable elements.

8. A gauge for measuring internal dimensions of a work piece comprising a support base, a tubular casing carried by said support, a plurality of concentrically arranged pressure members journalled in said casing for sliding movement axially thereof and each having a shoulder portion at one end thereof, said shoulder portions being arranged in circumferentially spaced relation, a gauging element individual to and actuated by the other end of each said pressure member, a primary piston mounted on and slidable along said base axially of said pressure members, a plurality of secondary pistons slidable axially within said primary piston, said secondary pistons being arranged in radially spaced relation about a central axis for engagement respectively with a corresponding one of said shoulder portions, a spring associated with each secondary piston for loading the same in the direction of said shoulder portion associated therewith and an electrical contactor device individual to each secondary piston and including a movable contact actuated thereby.

9. A gauge for measuring internal dimensions as defined in claim 8 wherein the said central axis for said secondary pistons is offset from the common center of said concentrically arranged pressure members.

10. A gauge for measuring internal dimensions as defined in claim 8 wherein said pressure members are constituted by shafts on which said gauging elements are mounted, there being a slight radial clearance between said shafts and the respective gauging elements to permit a corresponding floating action of said elements.

References Cited in the file of this patent

UNITED STATES PATENTS

| | | |
|---|---|---|
| 1,465,295 | Barholdy | Aug. 21, 1923 |
| 1,472,195 | Schlaupitz | Oct. 30, 1923 |
| 1,894,025 | Dennison | Jan. 10, 1933 |
| 2,267,559 | Foster | Dec. 23, 1941 |
| 2,443,880 | Aldeborgh | June 22, 1948 |
| 2,492,369 | Robins | Dec. 27, 1949 |
| 2,540,282 | Oliver | Feb. 6, 1951 |
| 2,563,216 | Dale | Aug. 7, 1951 |
| 2,581,473 | Eisele | Jan. 8, 1952 |